United States Patent
Deka

(10) Patent No.: US 9,849,717 B2
(45) Date of Patent: Dec. 26, 2017

(54) LASER PRINTABLE DRY-ERASE SUBSTRATES AND METHODS OF THEIR MANUFACTURE AND USE

(71) Applicant: Neenah Paper, Inc., Alpharetta, GA (US)

(72) Inventor: Ganesh Deka, Alpharetta, GA (US)

(73) Assignee: Neenah Paper, Inc., Marietta, GA (US)

( * ) Notice: Subject to any disclaimer, the term of this patent is extended or adjusted under 35 U.S.C. 154(b) by 655 days.

(21) Appl. No.: 14/187,766

(22) Filed: Feb. 24, 2014

(65) Prior Publication Data

US 2015/0239280 A1    Aug. 27, 2015

(51) Int. Cl.
*B43L 1/00* (2006.01)
*C09D 175/04* (2006.01)

(52) U.S. Cl.
CPC ............... *B43L 1/002* (2013.01); *B43L 1/00* (2013.01); *C09D 175/04* (2013.01); *Y10T 428/31554* (2015.04); *Y10T 442/277* (2015.04)

(58) Field of Classification Search
CPC ......... B43L 1/00; B43L 1/002; C09D 175/04; Y10T 428/31554; Y10T 442/277
See application file for complete search history.

(56) References Cited

U.S. PATENT DOCUMENTS

| | | | | |
|---|---|---|---|---|
| 5,037,702 A * | 8/1991 | Pitts | ...................... | D21H 21/30 427/372.2 |
| 5,217,255 A * | 6/1993 | Lin | ...................... | B41M 5/508 106/32.5 |
| 6,265,074 B1 * | 7/2001 | Shah | ...................... | B32B 7/12 156/278 |
| 2001/0024720 A1 * | 9/2001 | Sweet | ...................... | B41M 5/52 428/343 |
| 2001/0051265 A1 * | 12/2001 | Williams | ............. | B41M 5/0256 428/343 |
| 2004/0018345 A1 * | 1/2004 | Athorn-Telep | ......... | B32B 27/08 428/195.1 |
| 2010/0092671 A1 * | 4/2010 | Goscha | .................... | B43L 1/00 427/256 |

* cited by examiner

*Primary Examiner* — Jeremy R Pierce
(74) *Attorney, Agent, or Firm* — Dority & Manning, P.A.

(57) ABSTRACT

Laser printable, dry-erase substrates, along with their methods of formation and use, are provided. The laser printable, dry-erase substrate can include a base sheet defining a surface and a dry-erase coating on the surface of the base sheet. The dry-erase coating comprises a film-forming polymeric material (e.g., a polyacryl, a polymethacryl, a polyurethane-polyacryl mixture, a polyurethane-polymethacryl mixture, an urethane-acryl copolymer, or a mixture thereof) and a wetting agent (e.g., a nonionic surfactant that has a polyethylene oxide chain and an aromatic hydrocarbon lipophilic or hydrophobic group). The film-forming polymeric material melts and flows at a laser printing temperature so as to bond to toner ink.

13 Claims, 1 Drawing Sheet

LASER PRINTABLE DRY-ERASE SUBSTRATES AND METHODS OF THEIR MANUFACTURE AND USE

BACKGROUND

Surfaces that can be laser printed, written upon and easily erased have become popular replacements, or supplements, to chalkboards. These synthetic surfaces, often referred to as "white boards," are inexpensive to produce and are light in weight, making them easy to install in numerous locations. Typically, an erasable marker is used in conjunction with these boards allowing the writing to be removed with a dry eraser (i.e., a "dry-erase board"). The surfaces are white and typically are composed of, for example, melamine. They provide good contrast with dark colored markers and are usually easy to erase, when the writing is removed soon after application. However, currently available white board materials cannot generally be printed on after the coating has been applied.

Despite advances in white board manufacture, a need exists for the application of dry-erase properties to thinner, flexible substrates such as paper webs and/or films.

SUMMARY

Objects and advantages of the invention will be set forth in part in the following description, or may be obvious from the description, or may be learned through practice of the invention.

Laser printable, dry-erase substrates are generally provided, along with their methods of formation and use. In one embodiment, the laser printable, dry-erase substrate includes a base sheet defining a surface and a dry-erase coating on the surface of the base sheet. The dry-erase coating comprises a film-forming polymeric material (e.g., a polyacryl, a polymethacryl, a polyurethane-polyacryl mixture, a polyurethane-polymethacryl mixture, an urethane-acryl copolymer, or a mixture thereof) and a wetting agent (e.g., a nonionic surfactant that has a polyethylene oxide chain and an aromatic hydrocarbon lipophilic or hydrophobic group). Generally, the film-forming polymeric material melts and flows at a laser printing temperature so as to bond to toner ink.

A method is provided for laser printing a toner ink onto a laser printable, dry-erase substrate, such as described above. Methods are also provided for forming a dry-erase substrate. In one embodiment, the method of formation can include: applying a coating composition over a surface of a base sheet, with the coating composition including a film-forming polymeric material, a wetting agent, and a liquid carrier. Thereafter, the coating composition can be dried at a drying temperature (e.g., about 75° C. to about 106° C.) to substantially remove the liquid carrier such that the coating composition forms the dry-erase coating on the surface of the base sheet.

In certain embodiments, the coating composition comprises a plurality of dry-erase layers. For example, applying the coating composition of the surface of the base sheet can be achieved via: applying a first coating composition onto the surface of the base sheet; thereafter, drying the first coating composition at a drying temperature sufficient to substantially remove the solvent such that the first coating composition forms a first dry-erase layer over the surface of the base sheet; thereafter, applying a second coating composition onto the first dry-erase layer; and thereafter, drying the second coating composition at a drying temperature for a sufficient time to substantially remove the liquid carrier such that the second coating composition forms a second dry-erase layer over the first dry-erase layer. Additional layers may be applied in a similar manner.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
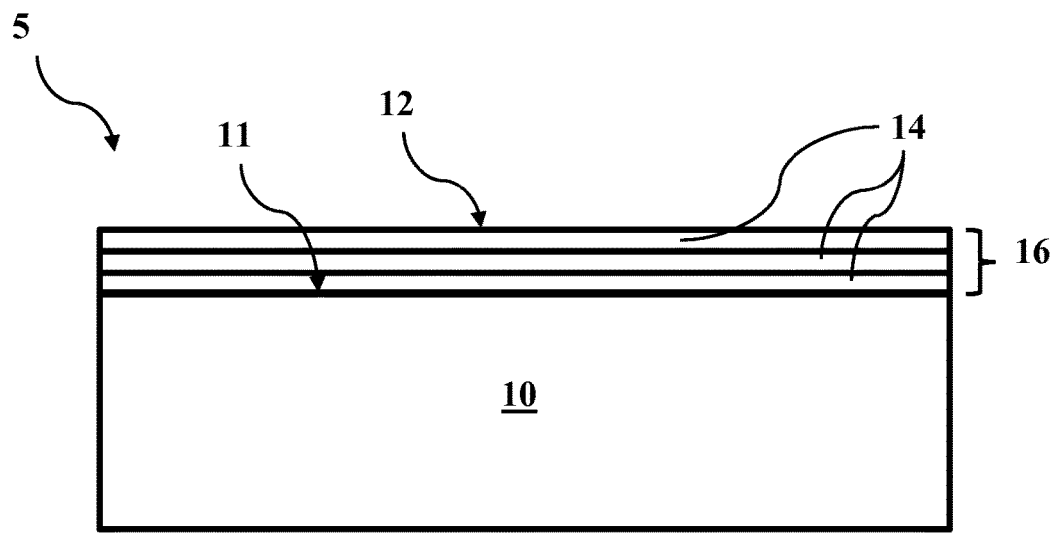
FIG. 1 shows a cross-sectional view of an exemplary laser printable, dry erase substrate.

Repeat use of reference characters in the present specification and drawings is intended to represent the same or analogous features or elements of the present invention.

DEFINITIONS

In the present disclosure, when a layer is being described as "on" or "over" another layer or substrate, it is to be understood that the layers can either be directly contacting each other or have another layer or feature between the layers, unless otherwise stated. Thus, these terms are simply describing the relative position of the layers to each other and do not necessarily mean "on top of" since the relative position above or below depends upon the orientation of the device to the viewer.

An "erasable" material refers to a material which will accept ink, but allows the ink to be removed or wiped off without substantial damage to the printable surface and/or the underlying material.

The term "toner ink" is used herein to describe an ink adapted to be fused to a printable coating or substrate with heat. Although the composition of the toner ink can vary (e.g., according to its color, the printing process utilized, etc.), the toner ink generally adheres to the image-receptive coating at the elevated printing temperatures. These toner printing processes result in the toner ink fusing to the image-receptive coating, which can increase the durability of the transferred image on the substrate.

The term "organic" is used herein to refer to a class of chemical compounds that are comprised of carbon atoms. For example, an "organic polymer" is a polymer that includes carbon atoms in the polymer backbone.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Coating compositions are generally provided that can be applied to a variety of substrates, then dried or cured to form durable, dry-erase surfaces on these substrates. In one embodiment, a thin, flexible substrate is generally provided having a dry-erase coating thereon, along with the methods of applying the coating onto the substrate. Even though the coatings have dry-erase capability, the coatings are laser printable to form a permanent image thereon. As such, the end user can print any desired template on the coating to form a customized dry-erase substrate.

Referring to FIG. 1, an exemplary laser printable, dry-erase substrate 5 is shown formed from a base sheet 10 having a dry-erase coating 16 on its surface 11. In the exemplary embodiment shown, the dry-erase coating 16 is formed from a three dry-erase layers 14. That is, a first dry-erase layer is on the surface 11 of the base sheet 10; a second dry-erase layer is on the first dry-erase layer, and a third dry-erase layer is on the second dry-erase layer. Thus, the third dry-erase layer forms the printable surface 12 of the substrate 5. Each of these components is discussed in greater detail below.

I. Base Sheet

The base sheet 10 is generally flexible and has first surface 11 and an opposite second surface. For example, the base sheet 10 can be a film or a cellulosic nonwoven web. In addition to flexibility, the base sheet also provides strength for handling, coating, sheeting, and other operations associated with the manufacture thereof.

In one embodiment, the base sheet is internally or surface sized so that aqueous based coating thereon does not substantially penetrate through. For example, if the base sheet is a paper web, the paper web can have a relatively low HST number such as 75-100.

In one particular embodiment, the base sheet can be surface sized. In such an embodiment, the surface sizing can include a starch solution added to the surface of the paper web by rollers. Surface sizing can be applied as a surface fiber sealant, improving strength and stress resistances, as well as impeding the penetration of ink far into the surface of the paper. Variations in the surface-sizing process and the materials used confer different advantages on the paper, such as increased water resistance and the ability to repel grease, oil, or other substances.

The basis weight of the base sheet 10 generally may vary, such as from about 30 to about 250 g/m$^2$. Suitable base sheets include, but are not limited to, cellulosic nonwoven webs and polymeric films (such as polyester films, polyolefin films, etc.).

In one embodiment, the base sheet 10 is a paper web formed from cellulosic nonwoven fibers. The paper web can have a basis weight of about 30 to about 250 g/m$^2$.

II. Dry-Erase Coating

The dry-erase coating 16 has dry-erase properties from conventional erasable markers, while still being laser printable to form a permanent image thereon. That is, the user can print toner ink onto the dry-erase coating 16 to form a permanent image, and still maintain the dry-erase functionality with respect to conventional erasable markers.

In one particular embodiment, the dry-erase coating 16 can be substantially transparent such that the underlying surface 11 of the base substrate 10 can be seen through the dry-erase coating. As such, the color of the base sheet 10 can be readily seen through the dry-erase coating 16. This transparent dry-erase coating 16 can be formed without the presence of any fillers or other opacifiers (e.g., $TiO_2$) in the coating composition.

In one embodiment, the dry-erase coating 16 is formed by applying a multiple coating layers. As shown in the exemplary embodiment of FIG. 1, the dry erase coating 16 is shown formed from three layers. Although shown with three layers 14, any suitable number of layers can be applied to achieve the desired coating thickness for the resulting dry-erase coating 16.

Each layer 14 of the dry-erase coating 16 is generally formed by applying a coating composition over the surface 11 of the base sheet 12, followed by drying. Methods of applying the coating composition to form the dry-erase coating 16 will depend mainly on the nature of the base sheet 10 and include, but are not limited to, gravure, offset gravure, flexographic press, offset press, roll, air knife, brush, meyer rod, silk screen and roller application methods. For example, as is well known in the art, flat, uniform materials such as paper and film can be readily coated with gravure, offset gravure, wire wound rod, offset lithographic press, and air knife methods.

For example, the coating composition of the first layer 14 can be applied directly onto the surface 11 of the base sheet 12, and then dried. Then, the coating composition of the second layer 14 can be applied over first layer on the surface 11 of the base sheet 12, and then dried. This process can be repeated to form the desired number of layers 14 and/or thickness of the resulting coating 16. The coating composition used to form each layer 14 can be substantially identical, or may be different, based on the desired properties of the layer 14. In one particular embodiment, each layer 14 has a substantially identical composition.

The coating composition utilized to form the layers 14 of the dry-erase coating 16 generally includes a film-forming polymeric material and a wetting agent. These components are generally provided with a liquid carrier, which is water-based in one particular embodiment.

The film-forming polymeric material generally melts and flows at the laser printing temperature so as to bond to the toner ink during laser printing. Suitable film-forming polymeric material can be selected from polyacryls, polymethacryls, polyurethane-polyacryl mixtures, polyurethane-polymethacryl mixtures, urethane-acryl copolymers, and mixtures thereof. In one particular embodiment, the film-forming polymeric material can include polyurethanes, such as aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Preferred polyurethanes can be selected from aromatic polyether polyurethanes, aliphatic polyether polyurethanes, aromatic polyester polyurethanes, and aliphatic polyester polyurethanes. Examples of preferred polyurethanes can include Sancure 1073C® (Lubrizol, Cleveland, Ohio), which is an aliphatic polyether polyurethane.

The wetting agent generally serves to allow the treatment composition to wet the entire surface 13 of the base sheet 12.

The wetting agent is, in one particular embodiment, a surfactant that aids in stabilization of the coating composition prior to and during application as well as ensuring that the coating composition sufficiently penetrates into the surface 11 of the base sheet 10. For instance, the surfactant(s) can be present in the dry-erase coating up to about 5%, such as from about 0.1% to about 1%, based upon the weight of the dried coating. Exemplary surfactants can include nonionic surfactants, such as a nonionic surfactant having a hydrophilic polyethylene oxide group (on average it has 9.5 ethylene oxide units) and a hydrocarbon lipophilic or hydrophobic group (e.g., 4-(1,1,3,3-tetramethylbutyl)-phenyl), such as available commercially as Triton®. X-100 from Rohm & Haas Co, of Philadelphia, Pa.

In one embodiment, the dry-erase coating comprises about 90 wt % to about 99.5 wt % of the film-forming binder (e.g., about 95 wt % to about 99 wt %) and about 0.5 wt % to about 5 wt % of the wetting agent (e.g., about 1 wt % to about 4 wt %), based on the dry weight of the dry-erase coating.

Other additives, such as processing agents, may also be present in the printable coating, including, but not limited to, thickeners, dispersants, emulsifiers, viscosity modifiers, humectants, pH modifiers, etc.

When it is desired to have a relatively clear or transparent dry-erase coating, the dry-erase coating can be substantially free from pigments, opacifying agents, and other coloring agents (e.g., free from metal particles, metalized particles, clay particles, etc.). In these embodiments, the underlying base sheet can be seen through the dry-erase coating, except where an image is printed on the printable, dry-erase coating.

Alternatively, pigments and other coloring agents may be present in the dry-erase coating such that the dry-erase coating provides a background color to the printable substrate. For example, the dry-erase coating may further include an opacifier with a particle size and density well suited for light scattering (e.g., aluminum oxide particles, titanium oxide particles, and the like). These opacifiers may be additional metal-oxide particles within the polymer matrix of the printable coating. These opacifiers can be present in the printable coating from about 0.1% by weight to about 25% by weight, such as from about 1% by weight to about 10% by weight.

After applying the treatment composition to the surface 13 of the base sheet 12, the treatment composition is dried at a drying temperature. The drying temperature is sufficiently high enough to remove (through evaporation) the liquid carrier (e.g., water) from the coating composition, while being sufficiently low enough to inhibit the film-forming polymeric material in the treatment composition from crosslinking. For example, the drying temperature can be about 75° C. to about 106° C. for 5 minutes. As such, the film-forming polymeric material in the resulting dry-erase coating is not substantially cross-linked (i.e., remains substantially uncrosslinked), while any solvent material in the treatment composition is removed. In one embodiment, the treatment composition is substantially free from a crosslinking agent.

In one embodiment, the film-forming polymeric material can be allowed to soften and melt at the printing temperature such that the toner ink bonds to the polymeric material. In another embodiment, the toner ink can be cross-linked to the polymeric material of the dry-erase coating 12, such as during the printing process. For example, printing a toner ink onto the dry-erase coating 12 can involve quickly and temporarily heating the toner ink and the dry-erase coating 12 to a printing temperature that is high enough to liquefy the toner ink and bond the toner ink to the film forming binder of the dry-erase coating 12. For example, the printing temperature can be about 175° C. to about 225° C.

III. Laser Printing

The presently disclosed dry-erase coatings 16 are configured to fuse with toner ink during a laser printing process. Digital electrographic toner printing (often referred to as laser printing) is a well-known method of printing high quality images onto a paper sheet. Another type of digital toner printing is called digital offset printing. When utilizing a toner ink printing process, the printable surface must be specially designed to fuse with the toner ink at the printing temperatures (e.g., typically from about 50° C. to about 120° C. but sometimes may reach as high as about 200° C.).

Figure 2:
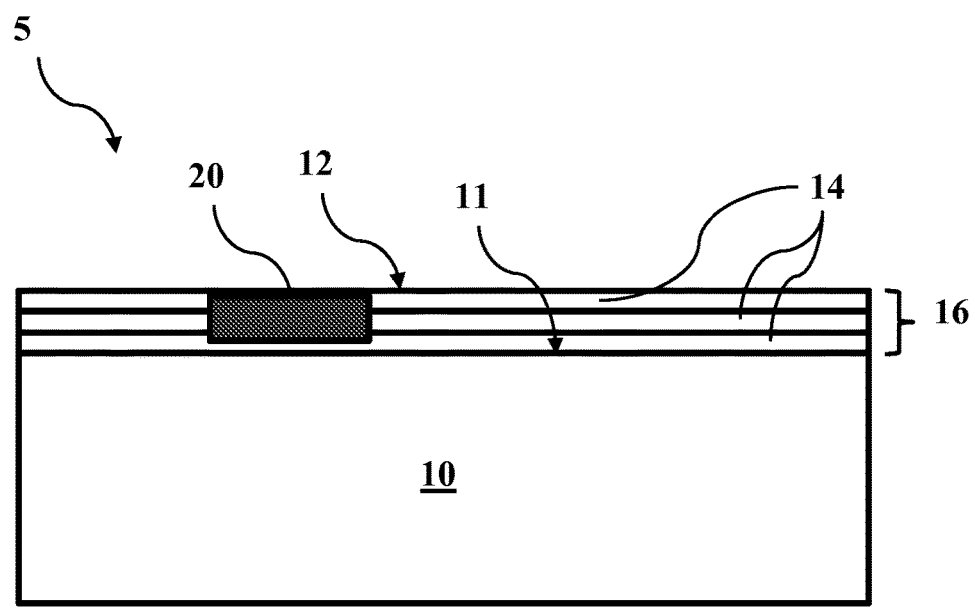
FIG. 2 shows a cross-sectional view of an exemplary laser printable, dry erase substrate having a toner printed image thereon.

Referring to FIG. 2, a toner ink 20 is shown fused to the dry-erase coating 16. Although the composition of the toner ink can vary (e.g., according to its color, the printing process utilized, etc.), the toner ink generally adheres to the dry-erase coating 16 at the elevated printing temperatures. These toner printing processes result in the toner ink fusing to the dry-erase coating 16, which can increase the durability of the transferred image on the substrate.

COMPARATIVE EXAMPLE 1

Commercially available dry erase paints are based on two part systems with (i) epoxy and cycloaliphatic amine as a hardener (Rust-Oleum®) and (ii) water based polyurethane and diisocyanate as a hardener (Sherwin Williams®).

Experiments were performed using dry erase paint from Rust-Oleum®. Specifically, polyester films and 176 gsm cardstock papers in 3 different colors were coated with Rust-Oleum™ paint. It was found that two coats were needed to maximize effectiveness of dry erase. The resulting coating has strong odor during drying, which was performed at about 30° C. with each coating layer requiring around 48 hours for complete curing. The sample sheets were coated at 14, 10 and 6 lb. total coat weight. It was found that a 5 lb./1300 square feet coat weight for each layer was needed to get a smooth and uniform finish as well as erasable surface. Dry erase markers were used in evaluating. Marks were present after erasing in lower coat weight than 10 lbs./1300 square feet. Lower coat weight also exposes color of the substrate and imperfection of sheet.

COMPARATIVE EXAMPLE 2

Sancure 898 (The Lubrizol Corporation, Wickliffe, Ohio), an aliphatic waterborne urethane polymer, was applied as a dry erase coating. It formed a hard, flexible, high gloss coating upon drying but did not result in any erasable property.

COMPARATIVE EXAMPLE 3

Using Sancure 1073C (The Lubrizol Corporation, Wickliffe, Ohio), a coating was applied on various paper substrates, including the paper available under the trade name Astrobrights® (Neenah Paper, Inc., Roswell, Ga.), and on a white polyester film available as SW84G 9200ga from SKC, Inc. It was found that Sancure 1073C does not completely wet out the surfaces, and thus did not resulting in a uniform coating.

EXAMPLE

A coating composition was formed that included Sancure 1073C (The Lubrizol Corporation, Wickliffe, Ohio) and a wetting agent, Triton® X-100 (The Dow Chemical Company):

| Component | % Solid | Dry | Wet |
|---|---|---|---|
| Sancure 1073C | 32.5 | 50 | 153.8 |
| Water | | | |
| Triton X-100 | 33.0 | 2 | 6.1 |
| Total | 32.5 | 52 | 159.9 |

This coating composition was applied on various paper substrates, including the paper available under the trade name Astrobrights® (Neenah Paper, Inc., Roswell, Ga.), and on a white polyester film available as SW84G 9200ga from SKC, Inc.

To achieve the maximum erasable characteristics, three layers of coatings were applied with #13 Meyer rod, and in each layer approximately 5 gsm of coating was applied. A slower drying time (i.e., 85° C. for 15 minutes) seems to provide a better gloss (and dry erase) property than a faster drying (e.g., 106° C. for 2-3 minutes).

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A laser printable, dry-erase substrate, comprising:
    a base sheet defining a surface;
    a dry-erase coating on the surface of the base sheet, wherein the dry-erase coating comprises a film-forming polymeric material and a wetting agent, and wherein the film-forming polymeric material melts and flows at a laser printing temperature so as to bond to toner ink;
    wherein the film-forming polymeric material in the dry-erase coating is substantially uncrosslinked.

2. The laser printable, dry-erase substrate as in claim 1, wherein the film-forming polymeric material comprises a polyacryl, a polymethacryl, a polyurethane-polyacryl mixture, a polyurethane-polymethacryl mixture, an urethane-acryl copolymer, or a mixture thereof.

3. The laser printable, dry-erase substrate as in claim 1, wherein the film-forming polymeric material comprises a polyurethane.

4. The laser printable, dry-erase substrate as in claim 3, wherein the polyurethane is an aromatic polyether polyurethane, an aliphatic polyether polyurethane, an aromatic polyester polyurethane, an aliphatic polyester polyurethane, an aromatic polycaprolactam polyurethane, or an aliphatic polycaprolactam polyurethane.

5. The laser printable, dry-erase substrate as in claim 3, wherein the polyurethane is an aliphatic polyether polyurethane.

6. The laser printable, dry-erase substrate as in claim 1, wherein the wetting agent comprises a nonionic surfactant that has a polyethylene oxide chain and an aromatic hydrocarbon lipophilic or hydrophobic group.

7. The laser printable, dry-erase substrate as in claim 1, wherein the dry-erase coating comprises about 90 wt % to about 99.5 wt % of the film-forming binder and about 0.5 wt % to about 5 wt % of the wetting agent, based on the dry weight of the dry-erase coating.

8. The laser printable, dry-erase substrate as in claim 1, wherein the dry-erase coating is substantially transparent such that the underlying surface of the base sheet can be seen through the dry-erase coating.

9. The laser printable, dry-erase substrate as in claim 1, wherein the dry-erase coating comprises a plurality of coating layers.

10. The laser printable, dry-erase substrate as in claim 9, wherein the dry erase coating comprises a first coating layer on the surface of the base sheet, a second coating layer on the first coating layer, and a third coating layer on the second coating layer.

11. The laser printable, dry-erase substrate as in claim 1, wherein the base sheet comprises a cellulosic nonwoven web.

12. The laser printable, dry-erase substrate as in claim 1, wherein the base sheet comprises a film.

13. A method of forming a customized dry-erase substrate, the method comprising:
    laser printing a toner ink onto the dry-erase coating of the laser printable, dry-erase substrate of claim 1.

* * * * *